United States Patent
Noguchi et al.

(10) Patent No.: US 7,288,131 B2
(45) Date of Patent: Oct. 30, 2007

(54) POROUS HONEYCOMB STRUCTURE

(75) Inventors: Yasushi Noguchi, Nagoya (JP); Hideaki Nishi, Toyoake (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 440 days.

(21) Appl. No.: 10/505,436

(22) PCT Filed: Mar. 14, 2003

(86) PCT No.: PCT/JP03/03082

§ 371 (c)(1),
(2), (4) Date: Aug. 24, 2004

(87) PCT Pub. No.: WO03/082437

PCT Pub. Date: Oct. 9, 2003

(65) Prior Publication Data
US 2005/0120690 A1 Jun. 9, 2005

(30) Foreign Application Priority Data
Mar. 29, 2002 (JP) ............... 2002-097400
Jan. 9, 2003 (JP) ............... 2003-003433

(51) Int. Cl.
*B01D 39/20* (2006.01)
*F01N 3/02* (2006.01)
(52) U.S. Cl. ................... 55/523; 428/116
(58) Field of Classification Search .......... 55/523, 55/DIG. 30; 428/116; 60/297, 311; 501/9
See application file for complete search history.

(56) References Cited
U.S. PATENT DOCUMENTS
5,463,462 A 10/1995 Ohnishi et al.
5,545,243 A 8/1996 Kotani et al.
5,634,952 A 6/1997 Kasai et al.
5,733,352 A 3/1998 Ogawa et al.
6,752,969 B1 * 6/2004 Nishimura et al. ......... 422/180
2005/0160710 A1 * 7/2005 Taoka et al. ................ 55/523

FOREIGN PATENT DOCUMENTS
EP 1188480 A1 * 3/2002
JP A 2-14711 1/1990
JP A 9-77573 3/1997
JP B2 2726616 12/1997

* cited by examiner

*Primary Examiner*—Frank M. Lawrence
(74) *Attorney, Agent, or Firm*—Oliff & Berridge, PLC

(57) ABSTRACT

A porous honeycomb structure includes: a plurality of partition walls containing cordierite as a main component and constituted of a porous ceramic having a porosity of 55 to 75% and an average pore diameter of 15 to 35 μm, wherein the partition walls have a pore distribution represented by the following condition formula (1):

$$Lr > 0.3 \times P/100 + 0.91, \quad (1)$$

"in the above condition formula (1), Lr means an average developed length ratio, and P means a porosity obtained from a total pore volume measured by a mercury press-in type porosimeter, assuming that a true specific gravity of cordierite is 2.52 g/cc."

The porous honeycomb structure is capable of effectively achieving raising of a trapping efficiency of soot or the like, lowering of a pressure loss, improving a purifying performance by effective use of a catalyst, and lengthening a trapping time, and is additionally capable of improving a dissolved loss limit at the time of filter regeneration, and an isostatic strength.

3 Claims, 5 Drawing Sheets

ABOUT 1 mm

PARTITION WALL
THICKNESS DIRECTION

1    PARTITION WALL    256
     THICKNESS DIRECTION

POROUS HONEYCOMB STRUCTURE

TECHNICAL FIELD

The present invention relates to a porous honeycomb structure. The present invention relates particularly to a porous honeycomb structure applicable as a filter for purifying an exhaust gas, which is capable of effectively lengthening a trapping time, raising a trapping efficiency, and lowering a pressure loss, when a pore distribution of partition walls is controlled and which is further capable of preventing a dissolved loss at the time of filter regeneration or improving an isostatic strength, and as a catalyst carrier which is capable of effectively improving a purifying performance and lowering a pressure loss and which is superior in isostatic strength.

BACKGROUND ART

In recent years, influences of particulate matters or NOx exhausted from an engine for an automobile, especially a diesel engine or the like onto environments have been brought into the public eye, and various uses of porous honeycomb structures as important means for removing these toxic substances have been studied.

For example, in a honeycomb structure including a plurality of through-holes partitioned by porous partition walls, a honeycomb filter has been developed including a structure in which the through-holes are plugged in different positions on opposite end faces including the through-holes opened therein. An exhaust gas is allowed to flow in each through-hole opened in one end face, and forcibly passed through the partition walls in the honeycomb structure to trap and remove the particulate matters in the exhaust gas. As new attempts to increase a catalyst support amount and to thereby improve a purifying performance, a catalyst body of a honeycomb structure has also been developed including the partition walls which are all formed into porous bodies having high porosities and which support a catalyst for decomposing HC or NOx.

Additionally, in the porous honeycomb structure, a high trapping efficiency has been naturally required in the application as the filter. When a certain or more amount of soot is deposited on pores opened in the surfaces of the partition walls, the pressure loss rapidly increases. Therefore, usually after the use for a certain time, a regeneration step is performed to burn the filter at a high temperature and to thereby burn up the soot. However, when this regeneration step is performed with a high frequency, degradation of the porous honeycomb structure is promoted. Therefore, a trapping time has been required to be lengthened to decrease the number of regeneration steps.

Furthermore, in the application as the filter, since the porous honeycomb structure is exposed at a remarkably high temperature at the time of the filter regeneration, the whole filter preferably has a certain or more thermal capacity in order to prevent a dissolved loss of the partition wall by the filter regeneration. When the soot is burnt, a maximum soot amount (soot limited regeneration amount) that does not cause the dissolved loss of the partition wall during the regeneration of the filter is required to be large.

On the other hand, in the application as the catalyst carrier, in recent years, there has been a demand for the increasing of a catalyst support amount for further improvement of an exhaust gas purifying performance, and attempts have been made to support the catalyst on the honeycomb structure whose porosity has been raised.

Moreover, in any application, there has been a demand for the reduction of the pressure loss in the porous honeycomb structure installed in a combustion engine such as a diesel engine strongly required to have reduced fuel consumption and increased output. Furthermore, since the porous honeycomb structure is disposed in the vicinity of the engine continued to be largely vibrated in any application, the structure needs to be firmly grasped in a metal case, and the whole honeycomb structure is required to have a high isostatic strength.

To meet these demands, a honeycomb structure or the like has heretofore been disclosed in which the pore distribution of the partition walls is controlled in various ranges.

For example, in Japanese Patent No. 2726616, a honeycomb structure has been described in which a specific surface area ($Mm^2/g$) of the pore opened in the surface of the partition wall and a surface roughness ($N\mu m$) in the filter surface are controlled in $1000M + 85N \geq 530$.

However, the honeycomb structure is manufactured using ceramic raw materials such as silica and talc whose particle diameters have been controlled, and the porosity is about 60% at maximum (Japanese Patent No. 2726616).

Moreover, in the honeycomb structure, the distribution of the pores inside the partition walls, except a ratio of pores opened in the surface of the partition wall with respect to the porosity of the whole partition wall, is not considered, and demands for the lengthening of the trapping time, the raising of the trapping efficiency, the improving of the purifying performance, and the lowering of the pressure loss have not been sufficiently satisfied.

On the other hand, a cordierite honeycomb structure (Japanese Patent Application Laid-Open No. 9-77573) has been proposed in which an organic foaming agent and carbon are added as pore formers to a cordierite raw material for use, and the number of 5 to 40 µm small holes is set to be five to 40 times that of 40 to 100 µm large holes among the pores in the surface of the partition wall.

However, also in this honeycomb structure, the ratio of the pores opened in the partition wall surface with respect to the porosity of the whole partition wall has not been considered. The honeycomb structure has been manufactured using an organic foaming agent which originally contains dense particles and which is hollowed when heated as a pore former material. Therefore, there is little organic foaming agent resulting in the opened surface of the partition wall just after extrusion molding. When the binder gels by heat in the subsequent drying step or the like, and the formed article is hardened, the surface of the partition wall is not largely expanded in such a manner as to be burst even by the foaming at a comparatively low temperature of 100° C. or less, and the number of pores opened in the partition wall surface has been small in the present situation. As a result, in the honeycomb structure, the pore distribution of the partition wall in a thickness direction has a deviation, and the demands for the raising of the trapping efficiency, the lengthening of the trapping time, and the lowering of the pressure loss have not been sufficiently satisfied. Since the amount of the catalyst supported inside the partition walls is very large because of the deviation of the pore distribution, an effective use ratio actually contributing to a purifying reaction is small, and a sufficient purifying performance has not been obtained. Furthermore, when the porosity of the whole partition wall is further raised in order to solve the problem, there has been a problem that a local dissolved loss on the partition wall at the time of the filter regeneration is caused by the decrease of the isostatic strength or the thermal capacity.

Moreover, even in the honeycomb structure manufactured using non-foaming pore formers such as PMMA and PET, the number of pores opened in the partition wall surfaces has been small in the present situation as described above. The demands for the effective raising of the trapping efficiency, the lengthening of the trapping time, the improving of the purifying performance, and the lowering of the pressure loss are not sufficiently satisfied. When the porosity of the whole partition wall is further raised, there has been a problem that the local dissolved loss of the partition wall at the time of the filter regeneration is caused by the decrease of the isostatic strength or the thermal capacity.

DISCLOSURE OF THE INVENTION

The present invention has been developed in consideration of the above-described problems, and an object thereof is to provide a porous honeycomb structure which is capable of effectively raising a trapping efficiency of soot or the like, improving a purifying performance by effective use of a catalyst, lowering a pressure loss, and lengthening a trapping time and which is further capable of improving a dissolved loss limit at the time of filter regeneration and an isostatic strength.

Moreover, as a result of intensive researches for achieving the object by the present inventor, findings have been obtained that when a honeycomb structure is manufactured by use of clay containing a foamed foaming resin added thereto, the honeycomb structure is obtained having a high porosity, including a large number of pores opened/formed in partition wall surfaces, and having a pore distribution in which a partition wall developed length ratio is not less than a specific value with respect to the whole porosity. It has been found that according to the honeycomb structure, the above-described conventional problems can be solved, and the present invention has been completed.

That is, according to the present invention, there is provided a porous honeycomb structure comprising: a plurality of partition walls containing cordierite as a main component and constituted of a porous ceramic having a porosity of 55 to 75% and an average pore diameter of 15 to 35 μm, wherein pores of the partition walls have a pore distribution represented by the following condition formula (1) (hereinafter sometimes referred to simply as "Condition Formula (1)").

$$Lr > 0.3 \times P/100 + 0.91 \quad (1)$$

"In Condition Formula (1), Lr means an average developed length ratio obtained by the following equation (2) (hereinafter referred to simply as "Equation (2)", and P means a porosity obtained from a total pore volume measured by a mercury press-in type porosimeter, assuming that a true specific gravity of cordierite is 2.52 g/cc."

$$Lr = Lo/4 \quad (2)$$

"In Equation (2), Lo means an average developed length (an average value of lengths including the surfaces of the pores opened in the partition wall surfaces) obtained when using a surface roughness measuring instrument and checking optional ten places on the partition wall surfaces every 4 mm (straight line length ignoring presence of the pores opened in the partition wall surfaces) along the partition wall surfaces with a stylus, and Lr means the average developed length ratio."

Moreover, in the present invention, further the pores of the partition walls preferably have a tomographic pore distribution represented by the following condition formula (3) (hereinafter sometimes referred to simply as "Condition Formula (3)") in a partition wall thickness direction.

$$X < -33 \times P/100 + 28 \quad (3)$$

"In Condition Formula (3), X denotes an average value of a primary component amplitude spectrum (F) and a secondary component amplitude spectrum (S) obtained from the following equations (4) and (5) (hereinafter sometimes referred to as "Equation (4)", "Equation (5)", respectively), and P means a porosity obtained in the same manner as in Condition Formula (1)."

$$F = \sqrt{X_{SRe}(1)^2 + X_{SIm}(1)^2} \quad (4)$$

"In Equation (4), F denotes the primary component amplitude spectrum assuming k=1 in the following conversion equation (6), and $X_{SRe}(1)$ and $X_{SIm}(1)$ denote a real part and an imaginary part, respectively, assuming k=1 in Conversion Equation (6)."

$$S = \sqrt{X_{SRe}(2)^2 + X_{SIm}(2)^2} \quad (5)$$

"In Equation (5), S denotes the secondary component amplitude spectrum assuming k=2 in Conversion Equation (6), and $X_{SRe}(2)$ and $X_{SIm}(2)$ denote a real part and an imaginary part, respectively, assuming k=2 in Conversion Equation (6)."

$$X_s(k) = \sum_{n=0}^{255} x(n) \left( \cos \frac{2\pi k}{256} \cdot n - j \sin \frac{2\pi k}{256} \cdot n \right) \quad (6)$$

"In Conversion Equation (6), $X_S(k)$ denotes a discrete Fourier transform, k denotes a degree, n denotes an integer of 0 to 255 indicating a divided position, when a partition wall section is divided into 256 in order in a thickness direction from a partition wall outermost surface portion (n=0), and X(n) denotes an area ratio occupied by a pore portion in a partition wall section region to the divided position of n to n+1."

In the present invention, a thickness of the partition wall is preferably set to 350 μm or less. A coefficient of thermal expansion at 40 to 800° C. can be set to $1.0 \times 10^{-6}$/° C. or less with respect to the whole honeycomb structure.

BEST MODE FOR CARRYING OUT THE INVENTION

Figure 1:
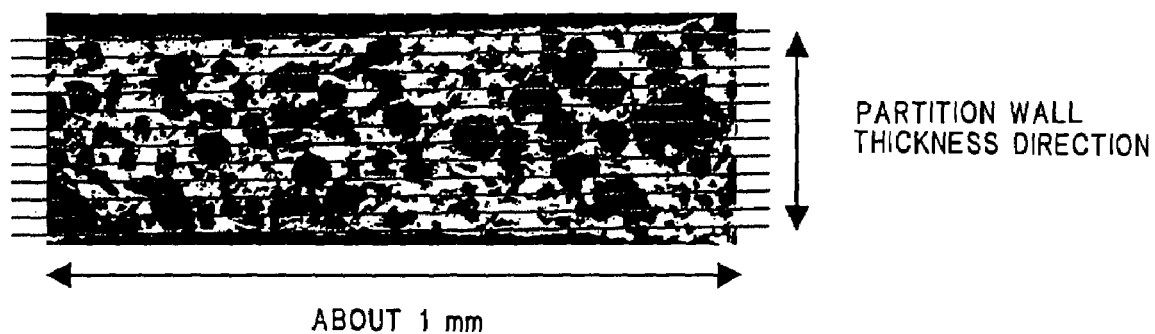
FIG. 1 is an example of a partially sectional view of a partition wall, showing a method of measuring a tomographic porosity distribution.

As described above, a porous honeycomb structure of the present invention contains cordierite as a main component, includes pores having a specific porosity and average pore diameter, and further has a porosity distribution in which a developed length ratio and porosity of each partition wall surface satisfy a specific condition formula. An embodiment of the present invention will be described hereinafter concretely.

In the present invention, cordierite which is the main component of the partition wall may be either oriented, non-oriented, α-crystalline, β-crystalline or the like. As components other than cordierite, for example, mullite, zircon, aluminum titanate, clay bond silicon carbide, zirconia, spinel, indialite, sapphirine, corundum, titania or the like may be contained alone, or two or more of them may also be contained.

Moreover, in the present invention, the partition walls of the honeycomb structure are constituted of a high-porosity ceramic having a porosity of 55 to 75%, more preferably 65 to 75%.

When the porosity is less than 55%, a transmission resistance in the partition wall against the exhaust gas is excessively large, and it is therefore difficult to lower a pressure loss to such an extent that any practical trouble is not caused even when a pore distribution is controlled as described later. It is also difficult to obtain a desired catalyst support amount. On the other hand, when the porosity exceeds 75%, the isostatic strength lowers, and the structure easily breaks when held into a case.

Moreover, in the present invention, the pores existing in the partition walls of the porous ceramic have an average pore diameter of 15 to 35 μm.

When the average pore diameter is less than 15 μm, a trapping efficiency rises, but an initial pressure loss increases. On the other hand, when the average pore diameter exceeds 35 μm, and even when the pore distribution is controlled as described later, it becomes difficult to secure a practically required trapping efficiency. Since soot is easily deposited inside the partition walls, and the soot is easily unburned inside the partition walls at the time of regeneration. Therefore, even after the regeneration, a soot deposited pressure loss does not lower in some case.

The honeycomb structure of the present invention further has a pore distribution in which the developed length ratio of each partition wall surface is not less than a specific numeric value with respect to the porosity of the whole partition wall, and concretely has a pore distribution which satisfies a condition of Condition Formula (1).

Accordingly, since a substantially useful soot deposited allowable volume increases in all the pores, the trapping efficiency is effectively raised, and a trapping time can be lengthened. Since a ratio of pores opened in the partition wall surfaces with respect to the porosity of the whole partition wall is large, the pressure loss is effectively lowered, or the catalyst support amount or an effective use ratio of the supported catalyst is increased, and accordingly a purifying performance can be effectively improved. As apparent from the above, even when the porosity of the whole partition wall is lowered to a certain degree, it is possible to obtain sufficient characteristics with respect to the trapping efficiency, trapping time, purifying performance, and pressure loss, and additionally the isostatic strength or a soot limited regeneration amount can be increased.

The partition walls in the porous honeycomb structure of the present invention further have a pore distribution in which a tomographic pore distribution in a thickness direction is represented by Condition Formula (3). This is preferable in that the characteristics required for the honeycomb structure, such as the partition wall dissolved loss at the time of filter regeneration, the isostatic strength, the trapping efficiency, the purifying performance, the pressure loss, and the trapping time, can be generally improved further.

That is, the honeycomb structure satisfying the condition of Condition Formula (3) has little fluctuation of a tomographic porosity distribution, and the pores existing in the partition walls are uniformly distributed without deviating inside the partition walls. Therefore, since the soot is hardly deposited inside the partition walls, and the amount of the soot remaining after the filter regeneration is small, the soot deposited pressure loss can further be reduced. Moreover, the honeycomb structure satisfying the condition of Condition Formula (3) does not lower the isostatic strength or the soot limited regeneration amount because of a decrease of the thermal capacity locally in each portion of the partition wall. Therefore, while satisfying these characteristics, the raising of the trapping efficiency, the lengthening of the trapping time, and the lowering of the pressure loss can be attained at higher levels. Similarly, since the catalyst support amount or the effective use ratio of the supported catalyst is further increased, the isostatic strength is satisfied, whereas a higher purifying performance can be achieved.

Figure 2:
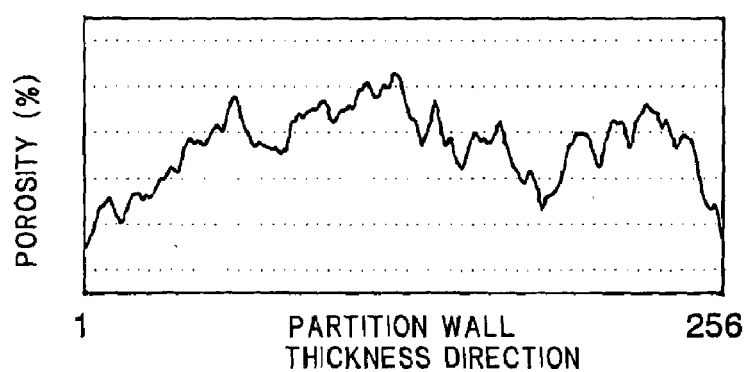
FIG. 2 is a graph showing an example of the tomographic porosity distribution obtained by a method shown in FIG. 1.
Figure 3:
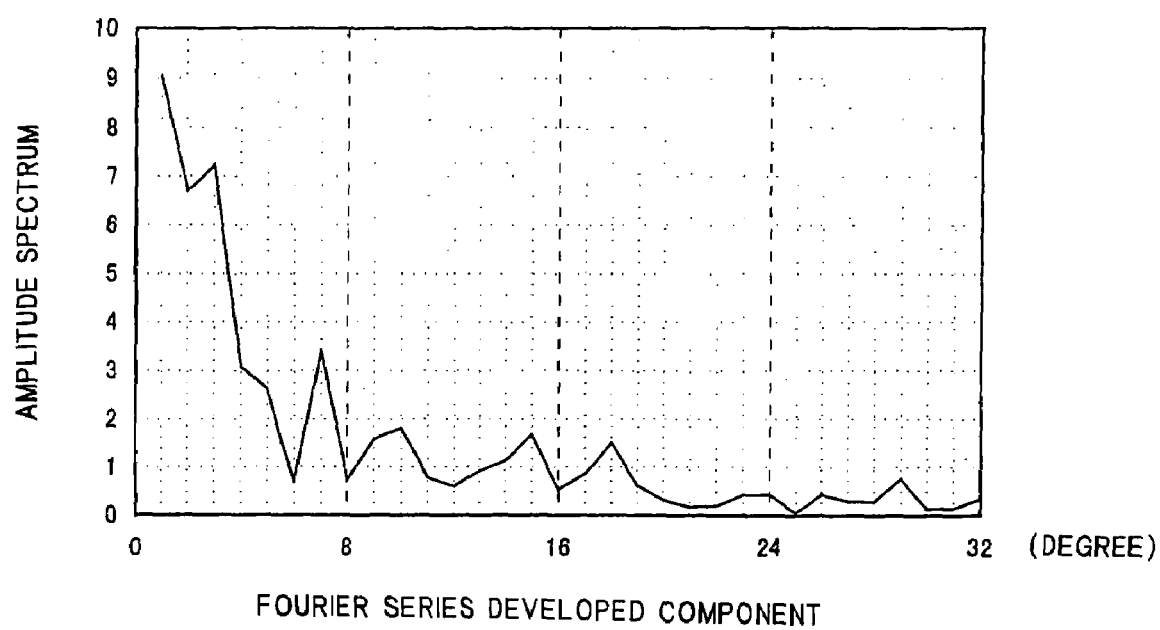
FIG. 3 is a graph showing a result of Fourier transform of the tomographic porosity distribution shown in FIG. 2 with each series.

Here, the tomographic porosity distribution in the partition wall thickness direction shown in Conversion Equation (6) can be measured by a scanning electronic microscope (SEM). Concretely, first a partition wall section of the honeycomb structure is observed at a magnification of 100 times, image data is binarized by image analysis software, a black portion is regarded as a pore portion, and a white portion is regarded as a honeycomb substrate portion. Moreover, as shown in FIG. 1, the section is divided into 256 in the partition wall thickness direction by a width of 1 mm in a partition wall length direction, and a ratio of an area occupied by the pore portions in each divided tomographic region is calculated. FIG. 2 shows an example of a tomographic porosity distribution X(n) obtained in this manner, and FIG. 3 shows results of Fourier transform of the tomographic porosity distribution X(n) shown in FIG. 2 with each series.

In the present invention, there is not any special restriction on respects other than various conditions of the pores disposed in the partition walls including the partition wall thickness, cell shape, cell pitch or the like of the honeycomb structure, and the respects may be preferably designed in accordance with applications or the like. Moreover, to impart a desired filter function, a structure is preferable in which a plurality of through-holes opened in an exhaust gas inflow-side end face and an exhaust gas exhaust-side end face are plugged in different positions on the opposite end faces.

Moreover, a catalyst can be supported on the porous partition walls of the honeycomb structure to form a catalyst body. In the use as the catalyst carrier, the cell density is preferably in a range of 6 to 1500 cells/inch$^2$ (0.9 to 233 cells/cm$^2$), and the thickness of the partition wall is preferably in a range of 50 to 2000 μm (about 2 to 79 mil). An axial direction (exhaust gas flow direction) length in the use as the catalyst carrier is usually 60 to 300 mm, preferably 100 to 250 mm.

Furthermore, an adsorptive layer may also be disposed on the catalyst carrier, and a layer having a large specific surface area and containing alumina or zeolite as a main component is usually preferably used. Zeolite may be either natural or synthetic, and a type thereof is not especially restricted, but an Si/Al ratio of 40 or more is for preferable use from standpoints of heat resistance, durability, and hydrophobic property. Concretely, ZSM-5, USY, β-zeolite, silicalite, metallo silicate, and the like are preferably usable.

Additionally, catalyst components may be supported directly on the honeycomb structure, and may also be supported on the adsorptive layer.

In the present invention, the whole partition wall has a uniform pore distribution, and the porosity can also be lowered to a certain degree as described above. Therefore, even when the partition walls are further thinned, the dissolved losses of the partition walls are prevented, and a desired isostatic strength can be secured. Therefore, when the partition wall thickness is set to 350 μm or less, a porous honeycomb structure having less pressure loss or higher catalyst effective use ratio can be constituted.

Further in the honeycomb structure of the present invention, when a foamed foaming resin that does not inhibit a cordierite reaction is used as means for forming pores in the vicinity of the partition wall surfaces, a coefficient of thermal expansion at 40 to 800° C. can be set to $1.0 \times 10^{-6}/°C$. or less, and a resistance to thermal shock at the time of use at a high temperature can be improved.

In the present invention, as a method of attaining the above-described pore distribution, a manufacturing method is preferable in which the foamed foaming resin such as acrylic microcapsule is added as a pore former to a cordierite raw material, and kneaded to form clay for use.

When hollow clay containing the foamed foaming resin added thereto is used from the first, the foamed foaming resin released from a pressing force expands in the partition walls immediately after extrusion molding of the clay, the resin existing in the vicinity of the partition wall surfaces protrudes from the partition wall surfaces and expands, finally an outer wall bursts, and a large number of pores opened in the partition wall surfaces are formed. The state before the drying is already similar to a state in which a large number of pores are formed. Therefore, even when the binder gels and accordingly a honeycomb formed article hardens in the subsequent drying step or the like, this does not decrease the number of pores opened in the partition wall surfaces.

Additionally, in the present invention, a method may also be combined in which particle diameters of ceramic raw materials such as talc and silica are controlled to control the porosity and the average pore diameter of the obtained filter. However, when the particle diameters for use are excessively large, it is difficult to obtain a desired pore distribution even with combined use of the foamed foaming resin. Therefore, talc having a particle diameter of 50 μm or less, or silica having a particle diameter of 100 μm or less is preferably used.

Furthermore, in the present invention, other materials such as carbon, flour, starch, phenol resin, polymethyl methacrylate, polyethylene, and polyethylene terephthalate may also be contained as the pore former. Above all, carbon such as graphite is preferable because carbon burns in a temperature range different from that in which the binder or the foaming resin is oxidized/decomposed to generate heat, and therefore calcining shortage is not easily caused.

Moreover, when the foamed foaming resin is used alone as the pore former, preferably 0.5 to 5 parts by mass, more preferably 1 to 3.5 parts by mass of the foamed foaming resin is contained with respect to 100 parts by mass of the cordierite raw material.

When the content of the foamed foaming resin is less than 0.5 parts by mass, the porosity is less than 55%, and the pressure loss of the obtained honeycomb structure increases. On the other hand, when the content of the foamed foaming resin exceeds 5 parts by mass, the porosity is larger than 75%, and the isostatic strength and the thermal capacity of the obtained honeycomb structure lower, and the structure hardly withstands practical use.

Furthermore, when carbon such as graphite is used together with the foamed foaming resin, from similar standpoints, 5 to 25 parts by weight of carbon, and 0.5 to 3 parts by weight of the foamed foaming resin are preferably contained with respect to 100 parts by weight of the cordierite raw material, and 5 to 15 parts by weight of carbon and 1 to 3 parts by weight of the foamed foaming resin are more preferably contained.

In the present invention, usually, as other additives, hydroxypropyl methyl cellulose, methyl cellulose, hydroxyethyl cellulose, carboxyl methyl cellulose, binder such as polyvinyl alcohol, ethylene glycol, dextrin, fatty acid soap, dispersant such as polyalcohol and the like may be preferably contained. It is to be noted that in the present invention, even when the binder gels and accordingly the formed article hardens in the drying step, any deviation is not generated in the pore distribution as described above.

The present invention will be described hereinafter more concretely in accordance with examples, but the present invention is not limited to these examples. It is to be noted that honeycomb structures obtained in examples and comparative examples were evaluated in the following method.

1. Evaluation Method (1) Average Pore Diameter of Pores

The diameter was measured by a mercury press-in type porosimeter manufactured by Micromeritics Co., Ltd.

(2) Porosity

A total pore volume was measured by the mercury press-in type porosimeter manufactured by Micromeritics Co., Ltd., a true specific gravity of cordierite was assumed as 2.52 g/cc, and a porosity was calculated from the total pore volume.

(3) Average Developed Length Ratio

A surface roughness measuring instrument FTS-S4C manufactured by Taylor Hobson Co., Ltd. was used, and a 2 μm R stylus tip was brought into contact with the partition wall surface of each of optionally selected ten places by 4 mm in a straight line length (length ignoring the presence of the opened pores) of the partition wall surface along the partition wall surface. A developed length (length in which the inner surface of an opened pore is considered) corresponding to the straight line length was measured. Next, an average value (Lo) of developed lengths on the partition wall surfaces of ten places was obtained, and the average developed length (Lo) was divided by 4 which was the straight line length to obtain an average developed length ratio (Lr). The average developed length ratio was divided by the porosity of the whole partition wall obtained in the above-described method to obtain the average developed length ratio per unit porosity.

(4) Uniformity of Tomographic Porosity (Average Value (X) of Primary Component Amplitude Spectrum (S) and Secondary Component Amplitude Spectrum (F))

As shown in FIG. 1, the partition wall section of a honeycomb structure was photographed by SEM in a range of 1 mm in a partition wall length direction, image data was binarized by image analysis software, a black portion was regarded as a pore portion, and a white portion was regarded as a honeycomb substrate portion. Thereafter, a 300 μm partition wall was divided into 256 in a thickness direction, and an area ratio of the pore portion in each divided region (n to n+1) was calculated in order from the partition wall surface as shown in FIG. 2. Subsequently, a change of the area ratio of the pore portion in the partition wall thickness direction was Fourier-transformed to obtain an amplitude spectrum of each wave as a wave having a frequency (n)=1, 2, and a primary component amplitude spectrum (S), and a secondary component amplitude spectrum (F) were obtained, respectively. Finally, an average value (X) of these numeric values was obtained to evaluate uniformity of a tomographic porosity.

(5) Trapping Efficiency

An exhaust gas in which soot was generated by a soot generator was passed through honeycomb structures obtained in examples and comparative examples for a certain time (two minutes). After the passing through a filter, the soot contained in the exhaust gas was trapped by filter paper to measure a weight ($W^1$) of the soot. At the same time, the example containing the soot generated therein was trapped by the filter paper without being passed through the filter to measure a weight ($W^2$) of the soot. Subsequently, the respective obtained weights ($W^1$) ($W^2$) were substituted into the following equation (7) to obtained a trapping efficiency.

$$(W^2-W^1)/(W^2) \times 100 \quad (7)$$

(6) Soot Trapping Pressure Loss

First, rings each having an inner diameter of φ130 mm were pressure-welded to opposite end faces of each of honeycomb structures obtained in the respective examples and comparative examples, and soot generated by a soot generator was passed into a range of φ130 mm of the honeycomb structure via the ring to trap 10 g of soot. Subsequently, in a state in which the soot was trapped by the honeycomb structure, 2.27 Nm$^3$/min of air was passed, and a pressure difference before/after a filter was measured to evaluate a pressure loss in the state in which the soot was trapped.

(7) Exhaust Gas Purifying Efficiency

A catalyst body in which a catalyst was supported by each of the honeycomb structures obtained in the respective examples and comparative examples was canned in a metal case, a 5 liter diesel engine was used, and a purifying efficiency of HC was evaluated. An exhaust gas from the engine was passed through the catalyst body of the honeycomb structure, and an HC concentration B1 in the exhaust gas before introduction into the catalyst body, and an HC concentration B2 in the exhaust gas after the passing through the catalyst body were measured to calculate 100×(B1−B2)/B1.

(Evaluation Results)

Figure 4:
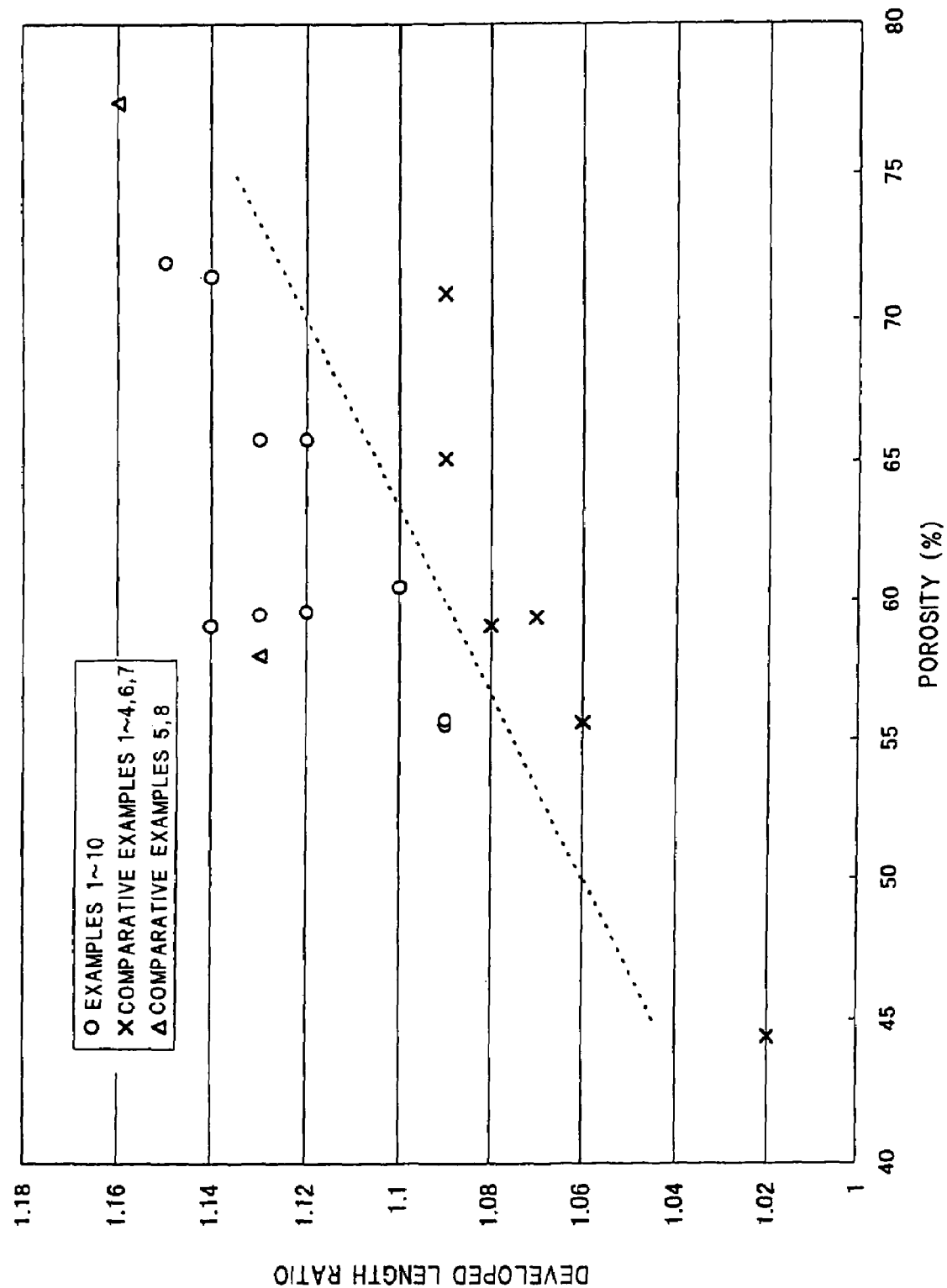
FIG. 4 is a graph showing results of examples and comparative examples with respect to a relation between a porosity and a developed length ratio.
Figure 5:
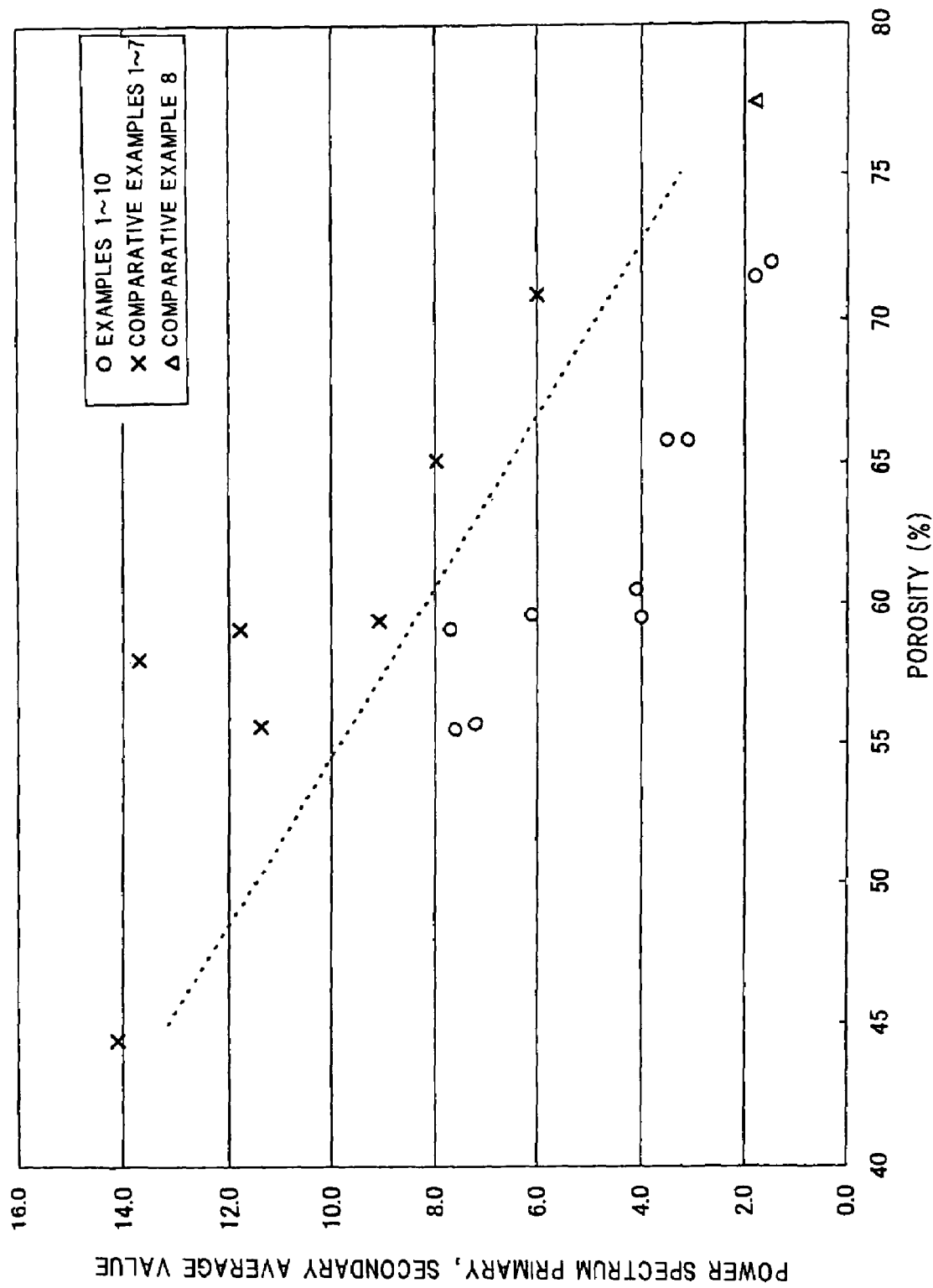
FIG. 5 is a graph showing results of the respective examples and comparative examples with respect to a relation between the porosity and an average value (X) of a primary component amplitude spectrum (S) and a secondary component amplitude spectrum (F)

In each of honeycomb structures of Examples 1 to 10 in which 2 to 3.5 parts by mass of a foamed foaming resin was added as a pore former as shown in Tables 2, 3, an average pore diameter of partition walls was 16.0 to 34.6 μm, and a porosity was 55.5 to 72.0%. In any example, a pore distribution of the obtained honeycomb structure satisfied conditions of Condition Formulas (1) and (3) as shown in FIGS. 4 and 5. Even in the honeycomb structures of Examples 1 and 7 in which comparatively coarse talc and silica raw materials were used, the conditions of these relation formulas were satisfied, and this was supposedly because the foamed foaming resin expanded in the partition walls immediately after the forming.

On the other hand, as pore formers, 2 parts by mass of the foamed foaming resin constituted of a graphite methyl methacrylate, 4 parts by mass of hydroxypropyl methyl cellulose, 0.5 parts by mass of lauric potash soap, and 30 parts by mass of water were projected and kneaded to obtain a plastic property. This plastic raw material was formed into cylindrical clay by a vacuum soil kneader, and projected into an extruder to form a honeycomb shape.

Subsequently, the obtained formed article was absolutely dried by hot air drying after dielectric drying, and opposite end faces thereof were cut into predetermined dimensions.

Subsequently, through-holes in a dried honeycomb article were alternately plugged in the opposite end faces in which the through-holes are opened with slurry constituted of a cordierite raw material having a similar composition.

Finally, the article was calcined at 1420° C. for four hours to obtain a honeycomb structure (honeycomb filter) having a size: φ144 mm×L 152 mm, a partition wall thickness: 300 um, and the number of cells: 300 cells/inch$^2$.

EXAMPLES 2 TO 10, AND COMPARATIVE EXAMPLES 1 TO 8

Honeycomb structures (honeycomb filters) were obtained in the same manner as in Example 1 except that cordierite raw materials and pore formers having compositions shown in Tables 1 and 2 were used in Example 1.

(Evaluation Results)

In each of honeycomb structures of Examples 1 to 10 in which 2 to 3.5 parts by mass of a foamed foaming resin was added as a pore former as shown in Tables 2, 3, an average pore diameter of partition walls was 16.0 to 34.6 μm, and a porosity was 55.5 to 72.0%. In any example, a pore distribution of the obtained honeycomb structure satisfied conditions of Condition Formulas (1) and (3) as shown in FIGS. 4 and 5. Even in the honeycomb structures of Examples 1 and 7 in which comparatively coarse talc and silica raw materials were used, the conditions of these relation formulas were satisfied, and this was supposedly because the foamed foaming resin expanded in the partition walls immediately after the forming.

On the other hand, in honeycomb structures of Comparative Examples 1 to 4, 6 manufactured using graphite, PET, and PMMA as the pore formers, pores were unevenly distributed inside, and any of the conditions of Condition Formulas (1) and (3) was not satisfied as shown in FIGS. 4 and 5.

Figure 6:
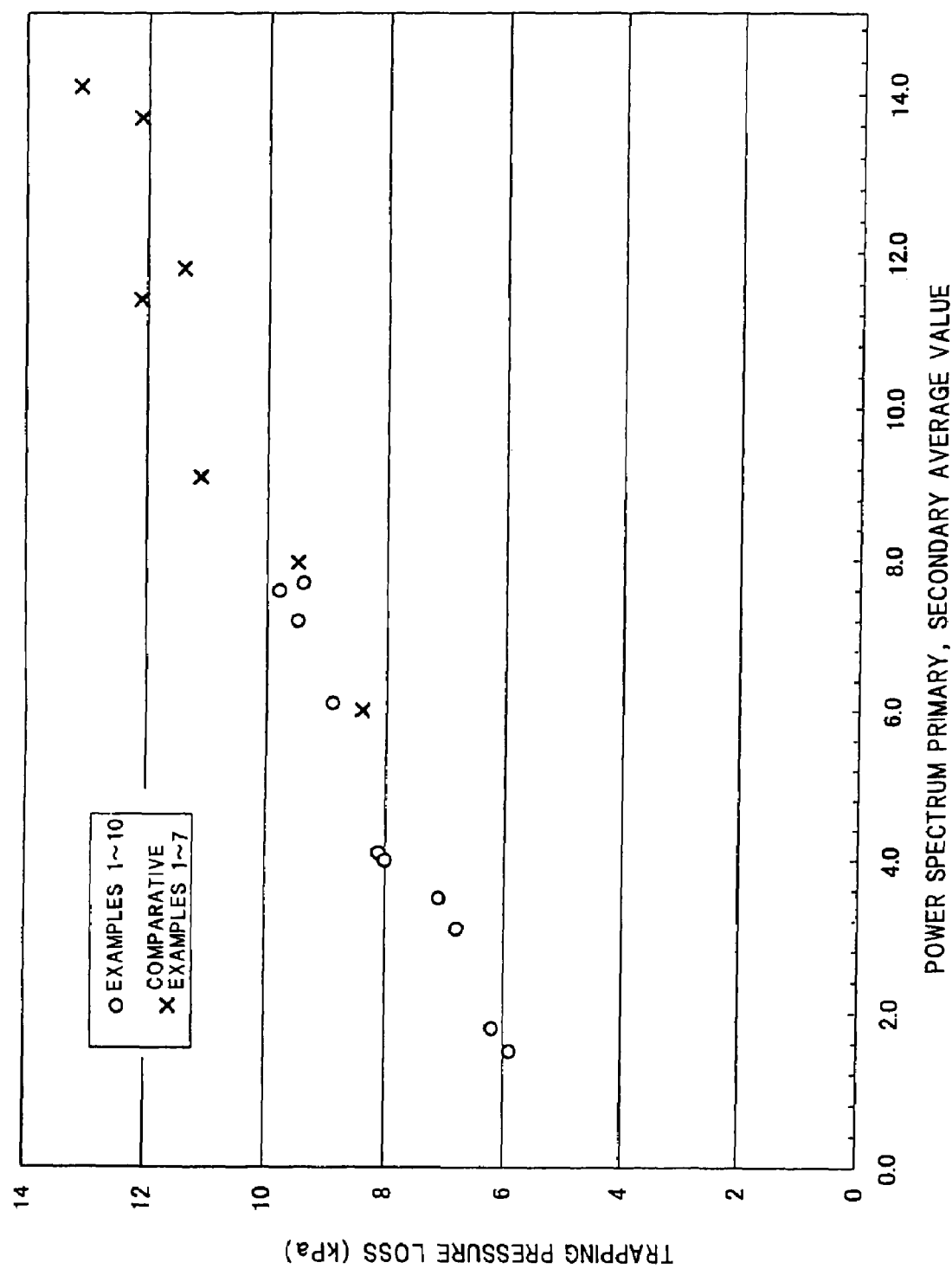
FIG. 6 is a graph showing results of the respective examples and comparative examples with respect to a relation between the average value (X) of the primary component amplitude spectrum (S) and the secondary component amplitude spectrum (F), and a soot trapping pressure loss.

Therefore, as shown in FIG. 5, in the porous honeycomb structures of the respective examples, as compared with the honeycomb structures of the respective comparative examples having almost the same degree of porosities, the average value (X) of the primary component amplitude spectrum and the secondary component amplitude spectrum was small. When the characteristics of the honeycomb structures having the equal porosity were compared, as shown in Table 3, the honeycomb structure of each example had a higher trapping efficiency and a lower trapping pressure loss as compared with those of the honeycomb structure of each comparative example. As shown in FIG. 6, all through the honeycomb structures, a tendency has been recognized that the smaller the average value (X) of the primary and secondary component amplitude spectrums is, a soot trapping pressure loss decreases.

On the other hand, in the honeycomb structure of Comparative Example 5 in which a very coarse silica raw material was used, since some of silica particles appeared on the partition wall surfaces to form pores, the condition of Condition Formula (1) was satisfied, but the average pore diameter was 35 μm or more, and the condition of Condition Formula (3) was not satisfied. Therefore, in the honeycomb structure, the trapping efficiency was 65% and very low, and the soot trapping pressure loss was very large.

Moreover, in the honeycomb structure of Comparative Example 7 manufactured using a non-foamed foaming resin foaming at 80° C. or more, either of the conditions of Condition Formulas (1) and (3) was not satisfied, the porosity was 44.4% and very low, and therefore the soot trapping pressure loss became very large. This was supposedly because the binder gelled and accordingly the formed article hardened in the drying step, and the non-foamed foaming resin was inhibited from being expanded in the formed article.

Furthermore, in the honeycomb structure of Comparative Example 8 in which 10 parts by weight of graphite was used together with 3.5 parts by weight of the foamed foaming resin, the porosity was 75% or more, the isostatic strength was very small, and therefore it was not possible to set the structure onto a jig for measurement of the soot trapping pressure loss.

TABLE 1

|  | Average particle diameter (μm) |
|---|---|
| Talc A | 20 |
| Talc B | 45 |
| Kaolin | 10 |
| Alumina | 5 |
| Aluminum hydroxide | 3 |
| Molten silica A | 25 |
| Molten silica B | 40 |
| Silica A | 5 |
| Silica B | 130 |
| Graphite | 40 |
| Foamed foaming resin | 50 |
| Non-foamed foaming resin | 15 |
| PMMA | 55 |
| PET | 50 |

TABLE 2

|  | Cordierite raw material blend ratio (wt %) | | | | | | Pore former blend ratio (wt %) | | | |
|---|---|---|---|---|---|---|---|---|---|---|
|  | Talc | Kaolin | Alumina | Aluminum hydroxide | Silica | Molten silica | Graphite | Foamed foaming resin | Non-foamed foaming resin | PMMA | PET |
| Example 1 | B: 40 | 20 | 14 | 16 |  | B: 10 |  | 2 |  |  |  |
| Example 2 | B: 40 | 20 | 14 | 16 |  | A: 10 |  | 2 |  |  |  |
| Example 3 | B: 40 | 20 | 14 | 16 |  | A: 10 | 10 | 2 |  |  |  |
| Example 4 | B: 40 | 20 | 14 | 16 | A: 10 |  | 10 | 2 |  |  |  |
| Example 5 | B: 40 | 20 | 14 | 16 |  | A: 10 |  | 2.5 |  |  |  |
| Example 6 | A: 39 | 19 | 14.5 | 16.5 | B: 11 |  |  | 2.5 |  |  |  |
| Example 7 | B: 40 | 20 | 14 | 16 |  | A: 10 | 10 | 2.5 |  |  |  |
| Example 8 | B: 40 | 20 | 14 | 16 |  | A: 10 |  | 3 |  |  |  |
| Example 9 | B: 40 | 20 | 14 | 16 | A: 10 |  | 10 | 3 |  |  |  |
| Example 10 | B: 40 | 20 | 14 | 16 | A: 10 |  |  | 3.5 |  |  |  |
| Example 11 | B: 40 | 20 | 14 | 16 |  | B: 10 |  | 2 |  |  |  |
| Comparative Example 1 | B: 40 | 20 | 14 | 16 |  | B: 10 | 15 |  |  | 10 |  |
| Comparative Example 2 | B: 40 | 20 | 14 | 16 |  | A: 10 | 20 |  |  | 10 | 2 |
| Comparative Example 3 | B: 40 | 20 | 14 | 16 |  | A: 10 | 25 |  |  | 15 | 10 |
| Comparative Example 4 | B: 40 | 20 | 14 | 16 |  | A: 10 | 25 |  |  | 25 | 10 |
| Comparative Example 5 | B: 40 | 20 | 14 | 16 | B: 10 |  | 20 |  |  | 10 | 5 |
| Comparative Example 6 | A: 39 | 19 | 14.5 | 16.5 | B: 11 |  | 20 |  |  | 10 | 5 |
| Comparative Example 7 | B: 40 | 20 | 14 | 16 |  | B: 10 |  |  | 2 |  |  |
| Comparative Example 8 | B: 40 | 20 | 14 | 16 |  | A: 10 | 10 | 3.5 |  |  |  |
| Comparative Example 9 | B: 40 | 20 | 14 | 16 |  | B: 10 | 15 |  |  | 10 |  |

TABLE 3

|  | Porosity (%) | Pore diameter (μm) | Coefficient of thermal expansion ($\times 10^{-6}$/° C.) | Partition wall surface developed length ratio Lr | Lr− (0.3 × porosity/ 100 + 0.91) | Power spectrum primary, secondary average value X | X− (−33 × porosity/ 100 + 28) | Trapping efficiency (%) | Trapping pressure loss (kPa) | Exhaust gas purifying efficiency (%) |
|---|---|---|---|---|---|---|---|---|---|---|
| Example 1 | 55.5 | 25.4 | 0.4 | 1.09 | 0.01 | 7.6 | −2.1 | 90 | 9.8 |  |
| Example 2 | 55.7 | 20.4 | 0.4 | 1.09 | 0.01 | 7.2 | −2.4 | 92 | 9.5 |  |

TABLE 3-continued

|  | Porosity (%) | Pore diameter (μm) | Coefficient of thermal expansion (×10⁻⁶/° C.) | Partition wall surface developed length ratio Lr | Lr− (0.3 × porosity/ 100 + 0.91) | Power spectrum primary, secondary average value X | X− (−33 × porosity/ 100 + 28) | Trapping efficiency (%) | Trapping pressure loss (kPa) | Exhaust gas purifying efficiency (%) |
|---|---|---|---|---|---|---|---|---|---|---|
| Example 3 | 59.6 | 24.6 | 0.6 | 1.12 | 0.03 | 6.1 | −2.2 | 90 | 8.9 |  |
| Example 4 | 60.5 | 16.0 | 0.4 | 1.10 | 0.01 | 4.1 | −3.9 | 96 | 8.1 |  |
| Example 5 | 59.5 | 25.2 | 0.6 | 1.13 | 0.04 | 4.0 | −4.4 | 90 | 8.0 |  |
| Example 6 | 59.1 | 34.6 | 0.7 | 1.14 | 0.05 | 7.7 | −0.8 | 85 | 9.4 |  |
| Example 7 | 65.8 | 23.1 | 0.7 | 1.12 | 0.01 | 3.5 | −2.8 | 91 | 7.1 |  |
| Example 8 | 65.8 | 23.9 | 0.8 | 1.13 | 0.02 | 3.1 | −3.2 | 90 | 6.8 |  |
| Example 9 | 71.5 | 21.4 | 0.7 | 1.14 | 0.02 | 1.8 | −2.6 | 93 | 6.2 |  |
| Example 10 | 72.0 | 21.8 | 0.8 | 1.15 | 0.02 | 1.5 | −2.7 | 92 | 5.9 |  |
| Example 11 |  |  |  | the same as Example 1 |  |  |  |  |  | 93 |
| Comparative Example 1 | 55.6 | 25.3 | 0.4 | 1.06 | −0.02 | 11.4 | 1.7 | 87 | 12.1 |  |
| Comparative Example 2 | 59.4 | 21.7 | 0.5 | 1.07 | −0.02 | 9.1 | 0.7 | 88 | 11.1 |  |
| Comparative Example 3 | 65.1 | 22.4 | 0.7 | 1.09 | −0.02 | 8.0 | 1.5 | 88 | 9.5 |  |
| Comparative Example 4 | 70.9 | 22.6 | 0.8 | 1.09 | −0.03 | 6.0 | 1.4 | 88 | 8.4 |  |
| Comparative Example 5 | 58.0 | 39.2 | 1.1 | 1.13 | 0.05 | 13.7 | 4.8 | 65 | 12.1 |  |
| Comparative Example 6 | 59.1 | 31.4 | 0.7 | 1.08 | −0.01 | 11.8 | 3.3 | 79 | 11.4 |  |
| Comparative Example 7 | 44.4 | 18.6 | 0.3 | 1.02 | −0.02 | 14.1 | 0.8 | 97 | 13.1 |  |
| Comparative Example 8 | 77.4 | 22.5 | 1.0 | 1.16 | 0.02 | 1.8 | −0.7 |  |  |  |
| Comparative Example 9 |  |  |  | the same as Comparative Example 1 |  |  |  |  |  | 85 |

* Comparative Example 8 had a remarkably small strength, and therefore was not settable onto a measurement jig for measuring the trapping efficiency or the trapping pressure loss.

EXAMPLE 11

A honeycomb structure (catalyst carrier) having a size: φ229.0 mm×L 152.0 mm, a partition wall thickness: 300 μm, and a cell density: 46.5 cells/cm² was manufactured in the same manner as in Example 1 except that a step of plugging through-holes was not performed in Example 1.

COMPARATIVE EXAMPLE 9

A honeycomb structure (catalyst carrier) having a size: φ229.0 mm×L 152.0 mm, a partition wall thickness: 300 μm, and a cell density: 46.5 cells/cm² was manufactured in the same manner as in Example 1 except that a step of plugging through-holes was not performed, and a cordierite raw material and a pore former having a composition similar to that of Comparative Example 1 as shown in Tables 1 and 2 were used in Example 1.

(Evaluation Result)

When 500 g of high specific surface area alumina and platinum-based oxide catalyst were supported on an obtained honeycomb structure to form a catalyst body, an exhaust gas purifying efficiency was 93% and large in the honeycomb structure of Example 11. On the other hand, in the honeycomb structure of Comparative Example 9, although 500 g of high specific surface area alumina and platinum-based oxide catalyst were similarly supported to form a catalyst body, the exhaust gas purifying efficiency was 85% and small as compared with the honeycomb structure of Example 11.

INDUSTRIAL APPLICABILITY

As described above, according to the present invention, there can be provided a porous honeycomb structure suitable as exhaust gas purifying means such as a diesel particulate filter and a catalyst carrier for purifying an exhaust gas. More concretely, there can be provided a honeycomb filter capable of effectively achieving raising of a trapping efficiency of soot or the like, lowering of a pressure loss, and lengthening of a trapping time, and additionally capable of improving a dissolved loss limit at the time of filter regeneration and an isostatic strength, and a catalyst carrier capable of effectively achieving improving of a purifying performance by effective use of a catalyst, or lowering of a pressure loss, and superior in isostatic strength.

The invention claimed is:
1. A porous honeycomb structure comprising:
a plurality of partition walls containing cordierite as a main component and comprising a porous ceramic having a porosity of 55 to 75% and an average pore diameter of 15 to 35 μm,
characterized in that pores of the partition walls have a pore distribution represented by the following condition formula (1):

$$Lr > 0.3 \times P/100 + 0.91 \qquad (1),$$

"in the above condition formula (1), Lr means an average developed length ratio obtained by the following equation (2), and P means a porosity obtained from a total pore volume measured by a mercury press-in type porosimeter, assuming that a true specific gravity of cordierite is 2.52 g/cc:"

$$Lr = Lo/4 \qquad (2),$$

"in the above equation (2), Lo means an average developed length (an average value of lengths including the surfaces of the pores opened in the partition wall surfaces) obtained when using a surface roughness measuring instrument and checking optional ten places on the partition wall surfaces every 4 mm (straight line length ignoring presence of the pores opened in the partition wall surfaces) along the partition wall surfaces with a stylus, and Lr means the average developed length ratio," and wherein the pores of the partition walls have a tomographic pore distribution represented by the following condition formula (3) in a partition wall thickness direction:

$$X \le -33 \times P/100 + 28 \quad (3),$$

"in the above condition formula (3), X denotes an average value of a primary component amplitude spectrum (F) and a secondary component amplitude spectrum (S) obtained from the following equations (4) and (5), and P means a porosity obtained from the total pore volume measured by the mercury press-in type porosimeter, assuming that the true specific gravity of cordierite is 2.52 g/cc:"

$$F = \sqrt{X_{SRe}(1)^2 + X_{SIm}(1)^2} \quad (4)$$

"in the above equation (4), F denotes the primary component amplitude spectrum assuming k=1 in the following conversion equation (6), and $X_{SRe}(1)$ and $X_{SIm}(1)$ denote a real part and an imaginary part, respectively, assuming k=1 in the conversion equation (6):"

$$S = \sqrt{X_{SRe}(2)^2 + X_{SIm}(2)^2} \quad (5)$$

"in the equation (5), S denotes the secondary component amplitude spectrum assuming k=2 in the following conversion equation (6), and $X_{SRe}(2)$ and $X_{SIm}(2)$ denote a real part and an imaginary part, respectively, assuming k=2 in the conversion equation (6),"

$$X_s(k) = \sum_{n=0}^{255} x(n) \left( \cos \frac{2\pi k}{256} \cdot n - j \sin \frac{2\pi k}{256} \cdot n \right) \quad (6)$$

"in the conversion equation (6), $X_s(k)$ denotes a discrete Fourier transform, k denotes a degree, n denotes an integer of 0 to 255 indicating a divided position, when a partition wall section is divided into 256 in order in a thickness direction from a partition wall outermost surface portion (n=0), and X(n) denotes an area ratio occupied by a pore portion in a partition wall section region to the divided position of n to n+1."

2. The porous honeycomb structure according to claim 1, wherein a thickness of the partition wall is 350 μm or less.

3. The porous honeycomb structure according to claim 1, wherein a coefficient of thermal expansion at 40 to 800° C. is $1.0 \times 10^{-6}$/° C. or less.

* * * * *